United States Patent [19]

Kern et al.

[11] Patent Number: 4,655,607
[45] Date of Patent: Apr. 7, 1987

[54] HIGH SPEED HOT AIR LEAK SENSOR

[75] Inventors: Mark T. Kern, Goleta; Robert J. Cinzori, Santa Barbara; William D. Fuller, Goleta, all of Calif.

[73] Assignee: Santa Barbara Research Center, Goleta, Calif.

[21] Appl. No.: 793,496

[22] Filed: Oct. 30, 1985

Related U.S. Application Data

[63] Continuation of Ser. No. 562,799, Dec. 19, 1983, abandoned.

[51] Int. Cl.$^4$ .................... G01K 1/16; G01N 25/72
[52] U.S. Cl. .................................. 374/4; 374/121; 374/135; 250/342
[58] Field of Search ............. 374/4, 5, 120, 121, 374/130–132, 135, 126; 340/605; 98/1.5; 237/12.3 R, 12.3 A; 356/43, 51; 250/341, 342, 338, 347, 353

[56] References Cited

U.S. PATENT DOCUMENTS

| | | | |
|---|---|---|---|
| 2,866,064 | 12/1958 | Kenkel | 250/338 |
| 3,405,271 | 10/1968 | Stevens et al. | 374/121 |
| 3,861,458 | 1/1975 | Ostrander et al. | 250/342 |
| 4,058,734 | 11/1977 | Vroombout | 374/126 |
| 4,285,466 | 8/1981 | Linscheid et al. | 98/1.5 |
| 4,293,768 | 10/1981 | Adachi et al. | 250/342 |
| 4,437,002 | 3/1984 | Taniguchi et al. | 250/342 |

Primary Examiner—Charles Frankfort
Assistant Examiner—Patrick R. Scanlon
Attorney, Agent, or Firm—Ronald L. Taylor; A. W. Karambelas

[57] ABSTRACT

A hot air leak sensor for sensing jet engine bleed air leaks in an aircraft. Infrared detectors are combined with thermal re-radiating elements which are installed in air passages adjacent to the bleed air ducts and downstream of the region where a bleed air leak may occur. The elements are approximately 50% transmissive and 50% absorptive to infrared radiation with wavelengths within the range of approximately 4 to 20 micrometers. Incident radiation within the field of view of the detector is both transmitted and absorbed for re-radiation to the detector. If no incident radiation within the sensor field of view is available, the re-radiating element still responds to the increased airstream temperature resulting from the bleed air leak and supplies radiation to the detector to provide detection of the leak.

24 Claims, 4 Drawing Figures

HIGH SPEED HOT AIR LEAK SENSOR

This is a continuation of application Ser. No. 562,799, filed Dec. 19, 1983 and now abandoned.

BACKGROUND OF THE INVENTION

1. Field of the Invention

The present invention relates generally to the field of infrared detectors and, more particularly, to particular infrared detecting devices for continuously monitoring and detecting hot air leaks in the bleed air duct of a jet aircraft engine.

2. Description of the Prior Art

Jet aircraft, particularly military fighter planes, fly at high altitudes in which the ambient air temperature is fairly cold, necessitating a defrosting system for the cockpit windshield and an environmental control system in the aircraft which is capable of heating the cockpit environment. The environmental control system, which is typically located adjacent the cockpit area, utilizes hot bleed air taken from the compressor of the jet engine.

A relatively small volume of air at high pressure nad high temperature is fed from the compressor section of the jet engine powering the aircraft. This air, since it is removed at a stage before combustion occurs in the engine, is suitable for use in the environmental control system.

A bleed air duct directs the hot bleed air from the engine, typically located in the rear of the aircraft, to the environmental control system which, as stated earlier, is adjacent the cockpit area near the front of the aircraft. It may therefore be appreciated that the bleed air duct carrying hot, pressurized air extends along a major portion of the fuselage of the aircraft.

Located in the fuselage of the aircraft and necessarily very near to the bleed air duct are complex electronics systems typically including the flight control systems, avionics display systems, communications equipment, and radar and weapons system components, as well as hydraulic controls, fuel lines and fuel tanks. Many of these systems and their components are highly susceptible to damage by exposure to excessive heat. This consideration makes it important to detect promptly any leak which may occur in the bleed air duct in order to minimize the possibility of serious damage or possible loss of the aircraft and pilot.

At present, two types of systems are known which have application to detecting air temperature, which systems may be considered for the purpose of detecting leaks in the bleed air duct system. The first type of system involves placing thermocouples at multiple locations along the length of the bleed air duct. Each of these thermocouples requires a pair of wires to connect it to an amplifier which may be multiplexed between several hundred thermocouples throughout an aircraft. Following the amplifier would be a threshold stage to detect when the thermocouple voltage has exceeded what corresponds to a selected temperature. Due to the number of wires and connections, and due to the low voltage level (and corresponding noise problems) of the thermocouple signal, this method is not generally used except perhaps for testing under controlled conditions.

The second type of system, and the one which has found use in jet aircraft, is the thermal wire system. This system, which is generally regarded as state-of-the art bleed air leak sensor technology, involves the placement of thermal wire in locations where a bleed air leak is most likely to occur. Should the thermal wire be exposed to a direct hot air leak from the bleed air duct, a warning will register.

Unfortunately, the thermal wire warning system will usually only function when a hot air leak is directed onto the thermal wire. When the leak is not directed onto the thermal wire, detection of the leak, if and when it is made, will be slow to develop, which could prevent detection until well after the bleed air leak has occurred, allowing sufficient time for aircraft systems to be damaged or destroyed. The military has reported incidents in which jet aircraft bleed air leaks went totally undetected, and aircraft are known to have sustained considerable damage because of a bleed air leak problem. It may therefore be appreciated that a more reliable bleed air leak detection system is needed.

Thus, it can be seen that there exists a strong need for a detection system capable of quickly and reliably detecting a bleed air leak before equipment located in the congested fuselage can be damaged or destroyed. Such a system must be capable of operating in the congested area, therefore requiring little space and keeping additional weight to a minimum. The bleed air leak sensor system should be capable of identifying a bleed air leak, even in circumstances when the leak is not directed onto the system sensors.

Unlike radiometer systems, the device must be capable of detecting leaks having a very small diameter. It is also desirable that the bleed air leak sensor system be capable of providing a continuous alarm signal as long as the bleed air leak condition continues; in other words, the leak sensor system must continue to function even in cases when the leak is directed onto the sensor itself. Since bays within military aircraft have airflow rates varying from minimal to substantial, depending on the aircraft, the bleed air leak sensor system must be capable of functioning in all types of airflow conditions. Finally, it is desirable that the system provide a warning to the pilot while the plane is still on the ground, thus requiring the system to detect an existing leak even with the engine idling or at least during taxiing or engine run-up prior to take-off.

SUMMARY OF THE INVENTION

In brief, arrangements in accordance with the present invention utilize an infrared detector device as the basis of a system to detect leaks in the bleed air duct of the aircraft. The infrared detector itself is an off-the-shelf item, and performs the detection function of a system to continuously monitor the spaces of the aircraft adjacent the bleed air duct to detect possible leaks. While the infrared sensor itself has a relatively narrow field of view, the present invention enables the sensor to detect hot air leaks within the fuselage, although such leaks are not within the immediate field of view of the sensor, by providing an element as a target means within the field of view of the sensor. The assembly including the detector and target element is located in areas downstream of the air flow within the fuselage so that the target's exterior surface may be heated by the air flow, causing the target to radiate infrared radiation within the field of view of the sensor and thus allow the sensor to detect the radiations from the target means. By locating multiple assemblies within the fuselage of the aircraft, detection of a leak in the bleed air system is made a virtual certainty.

In one preferred embodiment of the present invention, the target means is a blackened metal screen having about 50% emissivity which is mounted in front of the sensor. In another preferred embodiment, a coated window having about 50% transmissivity is located over the detector. In an alternative embodiment, a semi-transparent window manufactured of a material which has about 50% transmissivity is mounted in front of the detector. In the windowed embodiments, the window acts as the target element to absorb and re-radiate infrared radiation derived from placement of the target element in the downstream portion of air flow from a bleed air leak.

As stated above, several sensor assemblies may be mounted within the aircraft, typically in engine nacelles, the dry bays of the fuselage, the dorsal deck, and the area of the cockpit adjacent to the environmental control system. The system of the present invention, unlike the thermal wire system used in existing bleed air leak detection systems, will provide a quick and accurate warning upon occurrence of a leak in the bleed air ducts, due to the low thermal mass of the target means. The system of the present invention is effective at various aircraft speeds, resulting in the ability to provide a warning usually during engine idle or ground taxi prior to takeoff. Compatibility with either turbojet or turbofan engined aircraft is possible, with sensor assemblies located in the engine nacelle of the aircraft being downstream of the bleed air duct to insure detection of bleed air leaks within the engine nacelle.

In addition to being relatively inexpensive to implement, the present system is a low-volume, lightweight addition to the aircraft. The present invention is also quite flexible, and may be utilized for other hot air leak detection purposes, such as in boiler rooms in factories for example.

BRIEF DESCRIPTION OF THE DRAWING

A better understanding of the present invention may be had from a consideration of the following detailed description, taken in conjunction with the accompanying drawings in which.

DESCRIPTION OF THE PREFERRED EMBODIMENTS

Bleed air leak temperatures are substantially higher than the temperature of any other objects located in the fuselage near the bleed air duct. Therefore, these higher temperatures caused by a bleed air leak from the bleed air duct may be detected in the long wavelength infrared range, in the region of about 4 to 20 micrometers.

Figure 1:
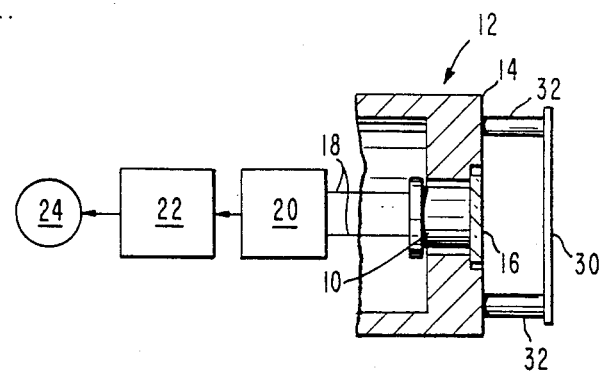
FIG. 1 shows the preferred embodiment of the present invention including a partial cross-sectional view of the sensor assembly and a schematic representation of the leak alarm system.

Therefore, the central component of the sensor assembly comprising the present invention is a thermal detector device which is spectrally sensitive to the long wavelength infrared region. In FIG. 1, one preferred embodiment of the present invention is illustrated, with a miniature thermopile detector 10 as the mechanism for detecting the infrared radiation due to a bleed air leak.

The miniature thermopile detector 10 illustrated in FIG. 1 is commercially available as a TO-5 package, which is hermetically sealed, rugged, and features high reliability and low cost while requiring no external cooling and whose noise level is well below that of expected signals. The detector 10 has a window area through which the infrared waves pass, with the window material typically being potassium bromide or a coated germanium filter, which allows transmission of the long wavelength infrared spectrum which must be detected for the present application. Such a device is fabricated by Santa Barbara Research Center and incorporates various types of coated filters as the optical front surface of the TO-5 package. This detector is described in U.S. Pat. Nos. 3,405,271, 3,405,272, and 3,405,273.

The thermopile detector 10 is incorporated in the sensor assembly 12, which also includes a housing 14 into which the thermopile detector 10 is fixedly mounted, for example by using an adhesive such as epoxy. An external window 16 is adhesively mounted in the housing 14 in front of the sensor window area of the thermopile detector 10. In the preferred embodiment illustrated in FIG. 1, the window 16 is virtually transparent to waves in the long wavelength infrared range, and is utilized primarily to protect the sensitive sensor window area of the thermopile detector 10 from dust and other contaminants which could possibly interfere with the transmission of infrared waves and inhibit detection of a bleed air leak.

The thermopile detector 10 produces an analog signal indicative of an elevated temperature source within the field of view of the detector 10, and this signal is provided through leads 18 to an amplifier 20. The amplifier 20 then provides a signal to the system monitor 22, which analyzes the signal to determine whether or not the magnitude of the signal indicates the presence of a high temperature indicative of a bleed air leak. If the system monitor 22 receives sufficient signal strength from the thermopile detector 10 through the amplifier 20, the system monitor 22 activates a warning indicator 24, which may be in the form of a light, buzzer, horn or other alarm. In addition to warning indicators, system monitor 22 may also be connected to valves (not shown) in the bleed air duct to shut down air flow automatically.

At this point it is useful to discuss the mechanisms through which the thermopile detector will generate a signal level indicating the presence of a bleed air leak. The first mechanism by which the thermopile detector 10 will produce a signal is the basic radiometric infrared sensing of heat. The thermopile detector 10 has an optical field of view which may be varied from approximately 5° to 90° by utilizing a focusing lens which may replace and function as the exterior window 16. The first mechanism will therefore cause the thermopile detector 10 to generate a signal indicating a bleed air leak whenever the bleed air leak begins to heat some object (such as engine nacelle walls) within the field of view of the thermopile detector 10.

By orienting the housing 14 of the sensor assembly 12 in specific locations within the fuselage of the aircraft, the field of view of the thermopile detector 10 may be directed to include portions of the bleed air duct at which a leak may occur. Since the bleed air duct itself is carrying hot air at from 400° F. to 1000° F., the exterior temperature of the bleed air duct under normal circumstances may range from 200°–300° F., depending on the temperature of the bleed air and the particular portion of the bleed air duct being checked (the end of the bleed air duct closest to the jet engine will be the hottest, the end of the bleed air duct closest to the environmental control system near the cockpit will be the coolest). The system monitor 22 establishes a threshold level to tune out temperature variations indicating merely the presence of the bleed air duct in the field of view of the thermopile detector 10.

The second mechanism by which the thermopile detector 10 produces a signal is based on a property of the detector 10 itself, which will produce a very strong signal when the exterior of the thermopile detector 10 is directly in the path of a bleed air leak. This second mechanism is a useful property, since it will produce a signal indicating elevated temperature even when the source of the elevated temperature is not within the field of view of the thermopile detector 10. Unfortunately, while the signal from the thermopile detector 10 will go high quickly in the presence of a bleed air leak directly onto the thermopile detector 10, as a result of the detector properties this signal will fall off within a few minutes.

The net effect of the phenomena is that the warning indicator 24 would indicate the presence of a bleed air leak directly on the thermopile detector 10 for at most only a few minutes, and then go off, leaving the pilot with no indication of the presence of a continuing bleed air leak. The likely conclusion of the pilot would be that an error existed in the bleed air leak detection system rather than the presence of a bleed air leak directly onto the thermopile detector 10, possibly resulting in pilot decision to continue the mission and thus risking possible loss of the aircraft and pilot.

It is therefore appropriate to initiate a third mechanism of detection to correct for the second mechanism deficiency mentioned above. The third mechanism must provide a signal which increases and holds while the level of the second mechanism signal is falling off to prevent the warning indicator 24 from going off and thus falsely indicating the absence of a bleed air leak in the presence of a continuing bleed air leak. This third mechanism basically involves placing a partially transparent target object in front of the field of view of the thermopile detector 10. The target object must be at least partially transparent in order to allow detection utilizing the first mechanism, namely basic radiometric infrared sensing of heat within the field of view of the thermopile detector 10, to be effective.

However, since the object is partially within the field of view of the thermopile detector 10, it will absorb thermal energy in the area even though the thermal energy emanates from a source not within the field of view of the thermopile detector 10. The object will then re-radiate the thermal energy absorbed within the field of view of the thermopile detector 10, thereby allowing the thermopile detector 10 to detect the presence of a thermal source not within the field of view of the thermopile detector 10.

The transparent object is defined by the ideal configuration in which it is 50% transparent and 50% absorptive, with the amount of re-radiated energy emitted being directly proportional to the amount absorbed. In the preferred embodiment of FIG. 1, the transparent object is a metal screen 30 in which the aperture area is 50% of the total area of the screen 30. The screen 30 is painted or plated flat black to produce optimum absorption characteristics. The screen 30 is mounted over the field of view of the thermopile detector 10 by means of a plurality of standoffs 32. The standoffs 32 may be screwed or bolted into the housing 14 and the screen 30 may be secured to the standoffs 32 by using adhesive.

Therefore, it can be seen that the first mechanism of the thermopile detector 10 will still function, although the presence of the screen 30 in the field of view of the thermopile detector 10 will produce a 50% attenuation of the first mechanism signal sensed by the thermopile detector 10. Mechanism two of the thermopile detector 10 will be unchanged, while the third mechanism is now provided by the screen 30 to compensate for the decreasing second mechanism signal. It may therefore be appreciated that it is important to mount the sensor assembly 12 in a downstream location in any airstream existing within the fuselage. Typically, within the aircraft there may be a cooling air flow in the area of the bleed air duct. By mounting the sensor assembly 12 downstream from where a bleed air leak may occur, the sensor assembly may utilize the third mechanism detection method to indicate the presence of a bleed air leak.

In tests made on the sensor assembly 12, it has been determined that by placing the sensor assembly 12 downstream of a bleed air leak and in an orientation such that the bleed air leak is not within the field of view of the thermopile detector 10, the detector may still determine and indicate the presence of the bleed air leak. This remarkable accomplishment is achieved even when the volume of cooling air is substantially higher than the volume of hot air produced from the bleed air leak, as for example in the engine nacelle of a turbofan engine aircraft.

Figure 2:
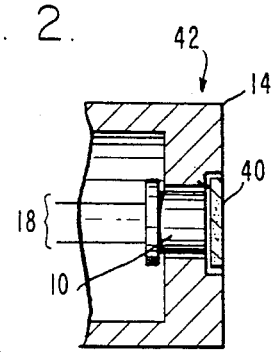
FIG. 2 is a partial cross-sectional view of one alternative embodiment of the sensor shown in FIG. 1.

In addition to the sensor 12 utilizing the screen 30 in order to produce a third mechanism signal, the present invention includes two alternative embodiments operating on the same general principle. In FIG. 2, the thermopile detector 10 is mounted in the housing 14, but instead of a virtually transparent exterior window 16 (which may include a focusing lens to modify the field of view of the thermopile detector 10), a coated window 40 is mounted in the housing 14 in front of the field of view of the thermopile detector 10. The coating is evenly distributed on the coated window 40 to provide about 50% transmissivity and 50% absorption, which characteristics correspond to those of the screen 30 in FIG. 1. The resulting device 42 of FIG. 2 operates on the same principles, with the third mechanism sensing of heat coming from heat being absorbed by the coating of the coated window 40 and re-radiated within the field of view of the thermopile detector 10, even though the source of heat is not within the field of view of the thermopile detector 10.

Figure 3:
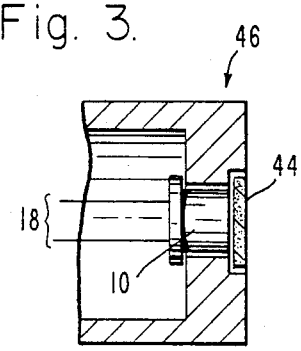
FIG. 3 is a partial cross-sectional view of a second alternative embodiment of the sensor shown in FIG. 1.

Similarly, in FIG. 3 a third embodiment is illustrated utilizing the thermopile detector 10 mounted in the housing 14, with a solid window 44 also secured to the housing 14. The characteristics of the solid window 44 are similar to those of the coated window in FIG. 2, and the third mechanism detection is the same. The sensor 46 of FIG. 3 would probably be the least expensive of the three embodiments to construct, although it would also be slightly slower to react to third mechanism signal input. Of the three embodiments, although the cost of construction is slightly higher than those of the embodiments illustrated in FIGS. 2 and 3.

Figure 4:
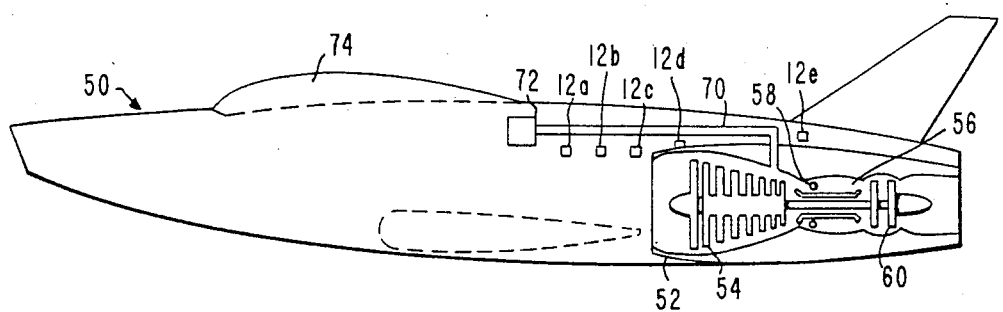
FIG. 4 is a cutaway schematic view showing the installation of the sensor assemblies of the present invention in a turbojet-powered jet aircraft.

The installation of sensor assembly 12 at various locations within the fuselage of an aircraft 50 is shown in FIG. 4 is configured as a single engine military fighter utilizing a turbojet power plant 52. The turbojet 52 has a compressor section 54, a combustor area 56 with fuel injectors 58, and a turbine section 60.

A bleed air duct 70 draws hot, compressed air at typically 50 to 300 psi and up to 1000° F. from the compressor section 54 of the turboject engine 52. The bleed air duct 70 leads forward through the dorsal portion of the fuselage of the aircraft 50 to an environmental control system 72 adjacent the cockpit 74 of the aircraft 50. In this installation, five sensors 12a, 12b, 12c, 12d, and 12e are shown to be mounted adjacent the bleed air duct 70 for detection of bleed air leaks from the bleed air duct 70. The sensor assemblies 12a, 12b, 12c, 12d, and 12e are oriented so that portions of the bleed air duct 70 particularly susceptible to bleed air leaks are within the specific field of view of the thermopile detectors 12 located in the sensor assemblies 12a–12e.

In addition, the sensor assemblies 12a–12e are also preferably located in the downstream portion of any cooling air flow existing within the fuselage of the aircraft 50. Particular locations which have been determined to be advantageous are in engine nacelles, dry bays of the fuselage, the dorsal deck, and the immediate neighborhood of the environmental control system 72. Generally, it is desirable to install a sensor assembly 12 such that a leak occurring at any point along the bleed air duct 70 will be "seen" by at least one sensor.

A similar installation could be employed if the engine in FIG. 4 were of the turbofan type.

Thus, it can be seen that the hot air leak sensors of the present invention is a highly advantageous solution to the problem of bleed air leak detection. The sensor assembly 12 of the present invention is highly compact and lightweight, thus enabling relatively easy installation of sensor assemblies 12 at strategic locations in an aircraft. The sensor assembly 12 of the present invention provides a highly accurate, reliable, and prompt indication of the presence of a bleed air leak, even when the bleed air leak is not within the field of view of the sensor assembly 12. The alarm signal continues as long as the bleed air leak condition exists, and has been found to be produced even when the jet engine is only idling and the aircraft is still on the ground. Thus, it can be seen that the present invention provides an accurate and highly useful solution at very low cost to a potentially extremely dangerous situation, and may well result in an early warning capable of saving an aircraft and the life of a pilot.

Although there have been described above specific arrangements of a high speed hot air leak sensor in accordance with the present invention for the purpose of illustrating the manner in which the invention may be used to advantage, it may be appreciated that the invention is not limited thereto. Accordingly, any and all modifications, variations or equivalent arrangements which may occur to those skilled in the art should be considered to be within the scope of the invention as defined in the annexed claims.

We claim:

1. A hot air leak sensor for detecting leaks in ducting within an aircraft fuselage, comprising:
   a housing;
   an infrared detector in the housing and having a predetermined optical field of view, said detector producing a threshold signal level when a thermal energy source of a predetermined strength is within said optical field of view;
   re-radiating means mounted to the housing within the field of view of said detector, said re-radiating means being both partially transparent to incident radiation as well as being capable of absorbing thermal energy and re-radiating the thermal energy to the detector;
   said housing being mounted within the fuselage adjscent the exterior of the ducting and oriented so that the field of view of the detector is directed to a specific location on the ducting; and
   whereby said detector is adapated to generate said threshold signal level whenever the ducting within the field of view of said in infrared detector generates thermal energy of said predetermined strength due to a hot air leak at the specific location, with said detector being further adapted to also generate said threshold signal level whenever said re-radiating means is heated due to a hot air leak in the ducting upstream of the housing and not in the field of view of said detector.

2. A hot air leak sensor as defined in claim 1 wherein said detector is responsive to infrared radiation having a wavelength in the 4 to 20 micrometer range.

3. A hot air leak sensor as defined in claim 1 wherein said detector produces an analog signal proportional to the level of incident radiation thereon and further comprising means for selecting said threshold level.

4. A hot air leak sensor as defined in claim 1 additionally comprising means for providing an alarm in response to signals from said detector exceeding said threshold level.

5. A hot air leak sensor as defined in claim 1 wherein said re-radiating means comprises a screen mounted within said optical field of view.

6. A hot air leak sensor as defined in claim 5 wherein said screen has apertures therein comprising approximately 50% of the total area of said screen, said apertures allowing the transmission therethrough of thermal energy.

7. A hot air leak sensor as defined in claim 5 wherein said screen includes a material which is absorptive of thermal energy.

8. A hot air leak sensor as defined in claim 7 wherein said screen is approximately 50% absorptive.

9. A hot air leak sensor as defined in claim 5 wherein said screen is mounted on a support member extending from said housing.

10. A hot air leak sensor as defined in claim 1 wherein said re-radiating means comprises a window having a surface, said window mounted in said housing and within said optical field of view.

11. A hot air leak sensor as defined in claim 10 additionally comprising a coating evenly disposed on the surface of said window, said coating being substantially equally transmissive and absorptive.

12. A hot air leak sensor as defined in claim 10 wherein said window is made of a material which is substantially equally transmissive and absorptive.

13. A hot air leak sensor as defined in claim 1 wherein said detector comprises a thermopile detector.

14. A hot air leak sensor as defined in claim 1 wherein said detector is mounted within a cavity in the housing and the re-radiating means is affixed to the housing in line with the detector.

15. A hot air leak sensor, comprising:
   a housing;

an infrared detector having a field of view, said detector mounted in said housing for producing an alarm signal whenever a thermal energy source of a predetermined level is within the field of view of said detector; and a partially transparent object interposed in the field of view of said detector and mounted to said housing within an airstream downstream of a potential hot air leak, said object being both transmissive and absorptive of infrared radiation in approximately equal proportions and capable of re-radiating absorbed radiation from a hot air leak outside the field of view of the detector to the detector and capable of transmitting incident radiation from a hot air leak within the field of view of the detector to the detector.

16. A hot air leak sensor as defined in claim 15 wherein said object is effective to re-radiate sufficient thermal energy absorbed from the airstream due to a hot air leak located outside the field of view of the detector to cause the detector to produce said alarm signal.

17. A hot air leak sensor comprising:
a housing;
an infrared detector fixedly mounted in said housing, said detector having an optical field of view extending outwardly therefrom which is unobstructed by said housing, said detector producing an output signal in response to radiation from a thermal source located in said optical field of view;
an apertured screen positioned in an airstream downstream from a region where a hot air leak may occur and within said optical field of view, said screen allowing a portion of incident infrared radiation due to a hot air leak within the optical field of view of the detector to pass through said screen to said detector and re-radiating to the detector absorbed infrared thermal energy due to heating in the airstream caused by a hot air leak outside the optical field of view of the detector; and
a standoff member attached to said housing for mounting said screen in said optical field of view of said detector.

18. A hot air leak sensor as defined in claim 17 wherein said screen is approximately 50% transparent to infrared waves, allowing approximately 50% of incident radiation to pass therethrough.

19. A method of detecting a leak in a hot air duct within an aircraft comprising:
locating at least one sensor within an air passage adjacent said duct and downstream from the location of a potential leak, said sensor having an infrared detector mounted in a housing including a semi-transparent member affixed thereto within the field of view of said detector, said semi-transparent member being both absorptive and transmissive of incident infrared radiation in approximately equal proportions; and orienting said sensor so that the field of view of the detector is directed to a specific location on the duct whereby said detector is adapted to generate an output signal to activate an alarm whenever the duct within the field of view generates infrared radiation due to a hot air leak at said specific location, with the detector also generating said output signal in response to re-radiated infrared radiation from said semi-transparent member as a result of absorbing heat from a hot air leak located upstream from the sensor and not in the field of view of the detector.

20. The method of claim 19 wherein the member is a semiconductor window having a coating which is approximately 50% transparent to infrared radiation with wavelengths in the range of 4 to 20 micrometers and is approximately 50% absorptive of such radiation.

21. The method of claim 19 wherein the member is a window formed of a semiconductor material which is approximately 50% transmissive and 50% absorptive to infrared radiation having wavelengths in the range of 4 to 20 micrometers.

22. The method of claim 19 further comprising locating a plurality of said sensors near the outlet of said air passage, with the fields of view of said detectors in each sensor directed upstream along the air passage.

23. A bleed air leak sensor for use in a jet aircraft having a jet engine and a bleed air duct diverting hot, pressurized air from the compressor portion of said jet engine to an environmental control unit, the sensor comprising:
a housing;
an infrared detector within the housing and having a field of view,
a semi-transparent target object having both transmissive and absorptive portions, said target object mounted on the housing adjacent the infrared detector within the field of view thereof;
said housing being located within an air passage adjacent said duct and being oriented such that a particular location on the duct is within the field of view of the detector; and
whereby said detector is responsive to infrared radiation due to a hot air leak at the particular duct location, as well as infrared radiation re-radiated from the target object due to an upstream hot air leak not in the field of view of the detector to generate an output signal sufficient to activate an alarm.

24. A bleed air leak sensor as claimed in claim 23 wherein said housing is mounted in a location selected from the group of engine nacelles, dry bays, the dorsal deck, and adjacent said environmental control unit.

* * * * *